United States Patent
Kasahara

(10) Patent No.: US 10,911,628 B2
(45) Date of Patent: Feb. 2, 2021

(54) IMAGE PROCESSING APPARATUS, METHOD, AND NON-TRANSITORY COMPUTER-READABLE STORAGE MEDIUM

(71) Applicant: CANON KABUSHIKI KAISHA, Tokyo (JP)

(72) Inventor: Kimito Kasahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/816,073

(22) Filed: Mar. 11, 2020

(65) Prior Publication Data
US 2020/0304674 A1    Sep. 24, 2020

(30) Foreign Application Priority Data
Mar. 22, 2019   (JP) .................................. 2019-054262

(51) Int. Cl.
| | | |
|---|---|---|
| H04N 1/00 | (2006.01) | |
| G06F 3/12 | (2006.01) | |
| G06K 15/00 | (2006.01) | |
| G06K 15/02 | (2006.01) | |

(52) U.S. Cl.
CPC ......... *H04N 1/00896* (2013.01); *G06F 3/121* (2013.01); *G06F 3/1203* (2013.01); *G06F 3/1229* (2013.01); *G06F 3/1285* (2013.01); *G06K 15/4055* (2013.01); *H04N 1/00037* (2013.01); *H04N 1/00079* (2013.01); *G06F 3/122* (2013.01); *G06F 3/1218* (2013.01); *G06F 3/1221* (2013.01); *G06K 15/1823* (2013.01)

(58) Field of Classification Search
None
See application file for complete search history.

(56) References Cited

U.S. PATENT DOCUMENTS

| | | | | |
|---|---|---|---|---|
| 7,302,195 B2 * | 11/2007 | Kobayashi | ............ | G06F 1/3203 399/8 |
| 2017/0308151 A1 * | 10/2017 | Zhang | .................... | G06F 1/3284 |
| 2018/0246686 A1 * | 8/2018 | Funakawa | ............. | G06F 1/3218 |

FOREIGN PATENT DOCUMENTS

| | | | |
|---|---|---|---|
| JP | 2009140312 A | * | 6/2009 |
| JP | 2014-050976 A | | 3/2014 |

OTHER PUBLICATIONS

Nakagawa, Shogo, JP-2009140312-A English Translation, par 0013-0023 (Year: 2009).*

* cited by examiner

*Primary Examiner* — Miya J Williams
(74) *Attorney, Agent, or Firm* — Canon U.S.A., Inc. IP Division

(57) ABSTRACT

In a client machine that collects first data that is operation information of an apparatus and second data related to a use situation of a plurality of pieces of hardware including a processor, a memory, and a storage, control is performed so that, in a case where the client machine is in a power-saving state at a timing when data that is collected in the apparatus is transmitted to an external system, recovery from the power-saving state is performed and transmission of the first data is not restricted, and transmission of the second data is restricted, and in a case where the client machine is not in the power-saving state at the timing, the transmission of the first data and the transmission of the second data are not restricted.

8 Claims, 10 Drawing Sheets

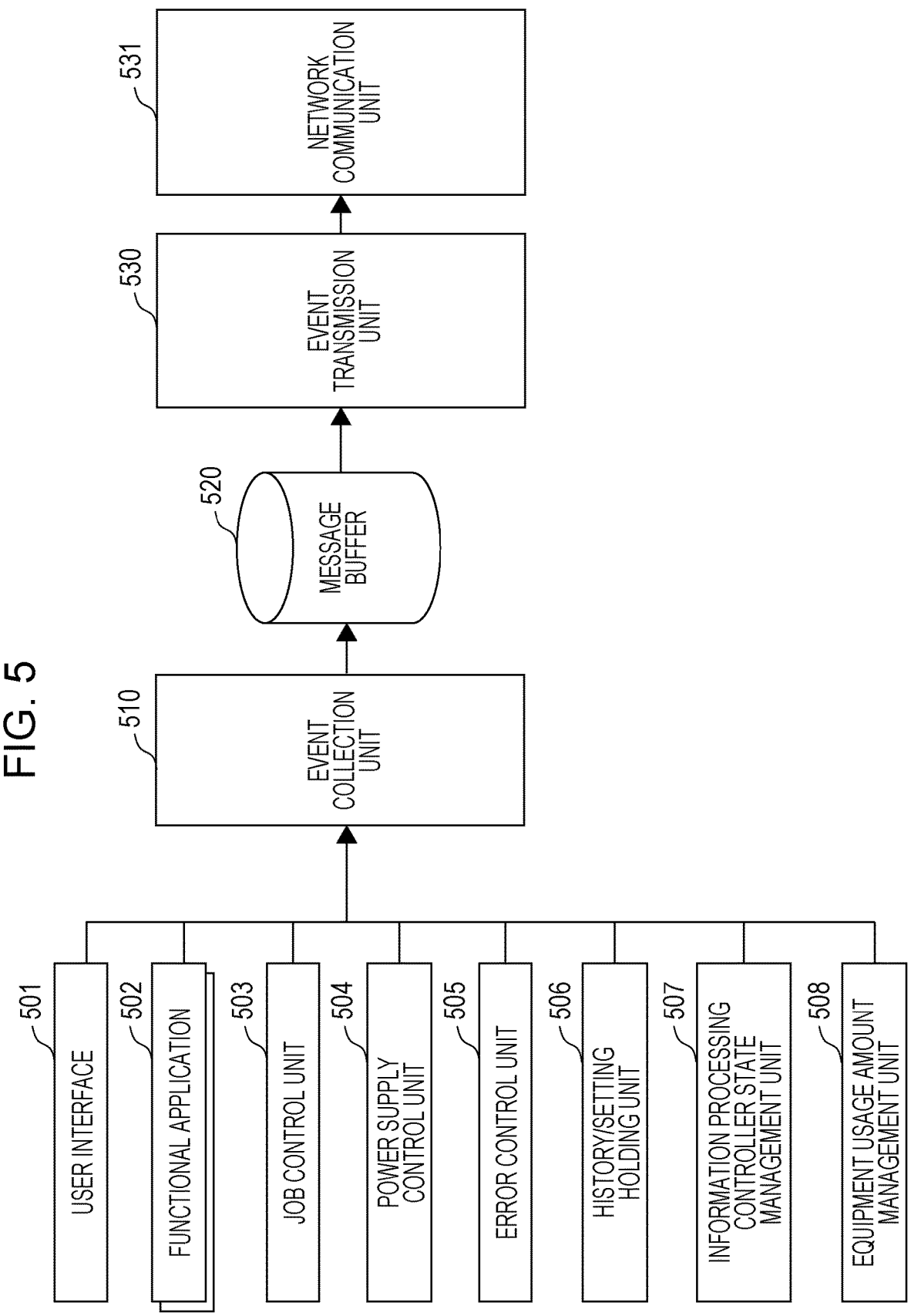

FIG. 6

```
{
  "event_type" : "device_charge_counts_snapshotted",
  "occur_datetime" : "2017-12-01T08:30:20+09:00",
  "attributes" : {
  },
  "additional_info" : [
    {
      "charge_counts" : {
        "mono_output_papers" : 111209,
        "color_output_papers" : 40203,
        "total_output_papers" : 71006,
      }
    }
  ]
}
```

FIG. 7

```
{
  "event_type" : "info_controller_usage_snapshotted",
  "occur_datetime" : "2017-12-01T08:30:20+09:00",
  "attributes" : {
  },
  "additional_info" : [
    {
      "CPU_usage" : {
        "average_usage_rate" : 31,
        "peek_usage_rate" : 91
      },
      "RAM_usage" : {
        "avarage_usage_rate" : 60,
        "peek_usage_rate" : 88
      }
      "HDD_usage" : {
        "average_usage_rate" : 12,
        "peek_usage_rate" : 12,
        "device_life_rate" : 8
      }
    }
  ]
}
```

FIG. 12

```
{
  "event_type" : "info_controller_usage_snapshotted",
  "occur_datetime" : "2017-12-01T08:30:20+09:00",
  "attributes" : {
    "snapshotted_on_wake_up" : true
  },
  "additional_info" : [
    {
      "HDD_usage" : {
        "device_life_rate" : 8
      }
    }
  ]
}
```

IMAGE PROCESSING APPARATUS, METHOD, AND NON-TRANSITORY COMPUTER-READABLE STORAGE MEDIUM

BACKGROUND

Field

The present disclosure relates to a technique by which data that is collected in an apparatus is transmitted to an external system.

Description of the Related Art

For a purpose of performing quick maintenance and improving a sign and prediction and a function installed in an apparatus, a system in which various event logs are transmitted to an event log administration server through the Internet from an apparatus in operation has been known. For example, among image processing apparatuses such as an MFP (Multifunction Peripheral) and a printer, there is an image processing apparatus that transmits operation information (a counter, an error, a job log, or the like) to an external system under a condition of a schedule, an occurrence timing, or the like.

Note that, a technique by which, in a case where an apparatus is in a power-saving state, the apparatus is controlled not to transmit data to an event log administration server has been known. Japanese Patent Laid-Open No. 2014-050976 discloses that a data transmission stop time zone is designated and an apparatus is woke up from the power-saving state (i.e. a sleep mode) at an end time of the transmission stop time zone.

SUMMARY

However, in accordance with an aspect of the present disclosure, it has now been determined that in a case where, as in a conventional case, control is performed so that data is not transmitted when the apparatus is in the power-saving state, though power consumption is able to be suppressed, data transmission of which is put off due to the power-saving state is not able to be acquired for a long time and various maintenance operations, improvement, and other processing may be thus hindered. For example, such an apparatus which performs charging to a user in accordance with a usage amount of the apparatus is required to be recovered even in the power-saving state and periodically transmit an event log.

In such a manner, the apparatus is required to appropriately perform control in accordance with a type of an event log to be periodically transmitted, but such control is difficult to be appropriately performed in the related art.

In accordance with another aspect of the present disclosure, an image processing apparatus includes a storage, a transmitter, at least one memory storing instructions, and at least one processor. The at least one processor executes the instructions to cause the image processing apparatus to manage a timing when data that is collected in the image processing apparatus is to be transmitted to an external system, transmit first data that is collected as operation information of the image processing apparatus and second data that is collected as a use situation of a plurality of pieces of hardware in the image processing apparatus to the external system through the transmitter in a case where a state of the image processing apparatus is not a power-saving state at the timing that is managed, and restrict transmission of the second data through the transmitter and transmit the first data to the external system through the transmitter in a case where the state of the image processing apparatus is the power-saving state at the timing that is managed.

Further features of the present disclosure will become apparent from the following description of exemplary embodiments with reference to the attached drawings.

BRIEF DESCRIPTION OF THE DRAWINGS

FIG. 5 is a block diagram of software, which illustrates an example of a software configuration of the client machine.

FIG. 6 is a view illustrating an example of event information that is normalized and saved in a message buffer.

FIG. 7 is a view illustrating another example of the event information that is normalized and saved in the message buffer.

FIG. 12 is a view illustrating an example of event information to be normalized and collected at a time of recovery from a power-saving state in a third embodiment.

DESCRIPTION OF THE EMBODIMENTS

Hereinafter, embodiments of the present disclosure will be described with reference to drawings.

First Embodiment

Figure 1:
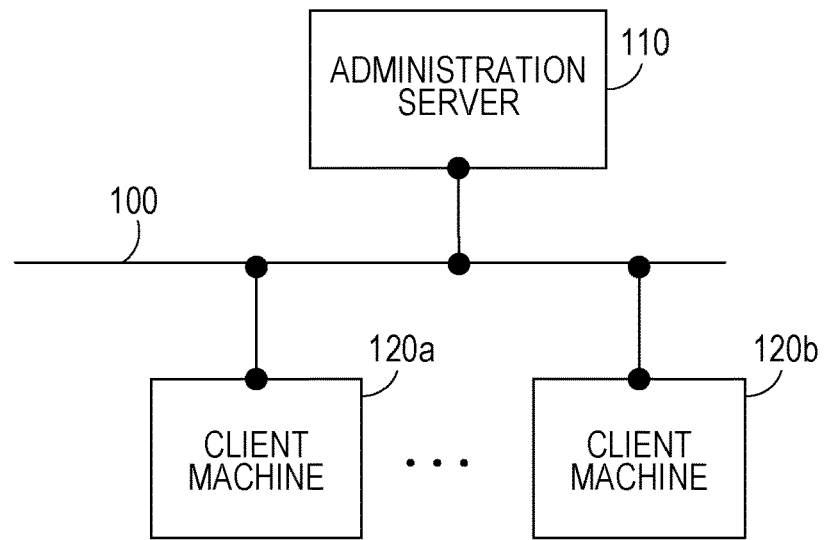
FIG. 1 is a view illustrating an example of a configuration of an entire system of an embodiment.

FIG. 1 is a view illustrating an example of a configuration of an entire system of an embodiment of the present disclosure.

As illustrated in FIG. 1, an administration server 110 and a plurality of client machines 120 (120a, . . . , 120b) are connected to a network 100.

Each of the client machines 120 has a communication function of notifying the administration server 110 of an event in the equipment in a form of a history event. Moreover, the administration server 110 has a function of saving events that are notified from the plurality of client machines 120 in a storage in the administration server 110. Information accumulated in the storage is used for, for example, analyzing operation monitoring information.

In the present embodiment, the administration server 110 is achieved by a general information processing apparatus, such as a computer, which is capable of having a data storage function, an information processing calculation function, and a network communication function, or a cloud service having the same functions.

Moreover, description will be given by taking an image processing apparatus such as a multifunction peripheral achieving various types of functions of, for example, copying, printing, faxing, and the like as an example of the client machine 120. In addition to an execution history of such a function, the client machine 120 has a function of notifying the administration server 110 of, for example, a history of transition to a power-saving state or wake-up therefrom, a history of transition to an abnormal state such as error occurrence or recovery therefrom, or the like.

Figure 2:
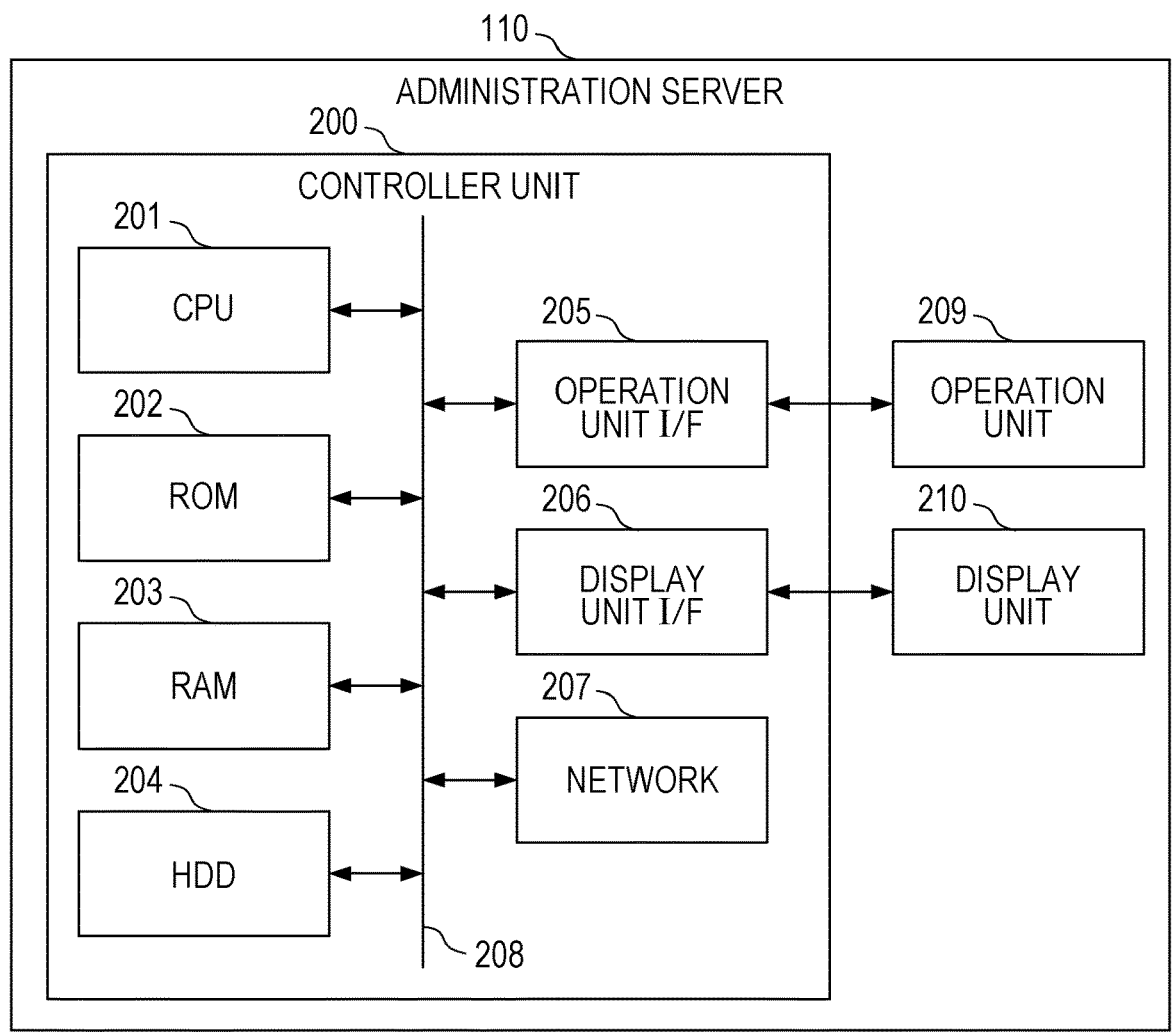
FIG. 2 is a block diagram illustrating an example of a hardware configuration of an administration server.

FIG. 2 is a block diagram illustrating an example of a configuration in a case where the administration server 110 is achieved by a general information processing apparatus such as a computer.

The administration server 110 includes a controller unit 200, an operation unit 209, and a display unit 210.

The controller unit 200 includes a CPU (Central Processing Unit) 201.

The CPU 201 starts up an OS (Operating System) by a boot program saved in a ROM (Read Only Memory) 202. The CPU 201 executes an application program saved in an HDD (Hard Disk Drive) 204 on the OS to execute various kinds of processing. As a work area of the CPU 201, a RAM (Random Access Memory) 203 is used. The application program and data related to setting, a history, and the like are saved in the HDD 204. Note that, a configuration in which another storage device such as an SSD (Solid State Drive) is included instead of or in combination with the HDD 204 may be provided.

An operation unit I/F 205, a display unit I/F 206, and a network 207 are connected to the CPU 201 together with the ROM 202 and the RAM 203 via a system bus 208.

The operation unit I/F 205 is an interface with the operation unit 209 that is constituted by a mouse, a keyboard, or the like, and transmits, to the CPU 201, information input by a user with use of the operation unit 209.

The display unit I/F 206 outputs image data, which is to be displayed on the display unit 210 that is constituted by a display or the like, to the display unit 210.

The network 207 is connected to the network 100 and input/output of information with respect to each apparatus on the network 100 is performed through the network 100.

Figure 3:
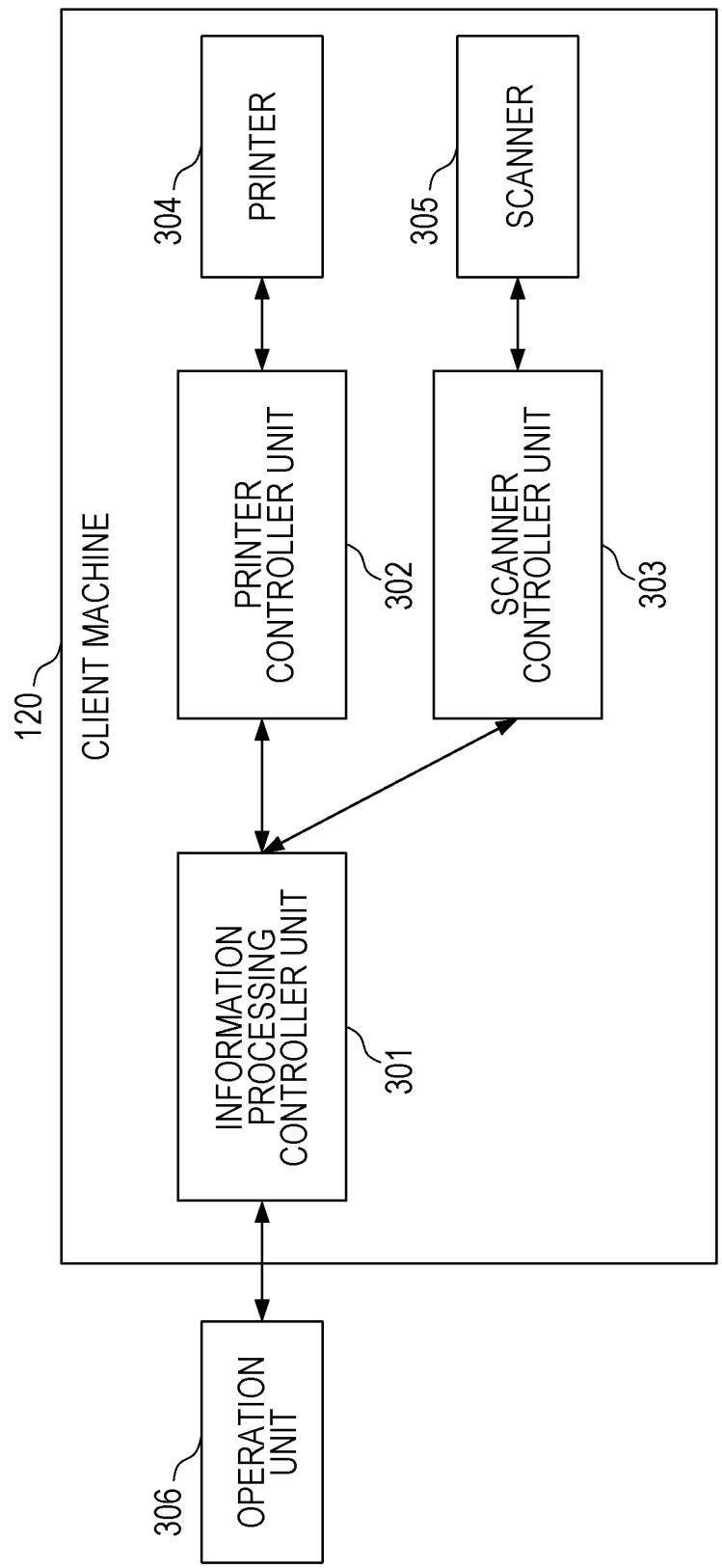
FIG. 3 is a block diagram illustrating an example of a hardware configuration of a client machine.

FIG. 3 is a block diagram illustrating an example of a hardware configuration of the client machine 120.

The client machine 120 is a multifunction peripheral that includes an information processing controller unit 301, a printer controller unit 302, a scanner controller unit 303, a printer 304, a scanner 305, and an operation unit 306.

The information processing controller unit 301 is a controller to integrate control of information processing related to an operation of the client machine 120, and the operation unit 306 is connected thereto. Furthermore, the printer controller unit 302 which controls the printer 304 that is an image output device and the scanner controller unit 303 which controls the scanner 305 that is an image input device are connected to the information processing controller unit 301.

Figure 4:
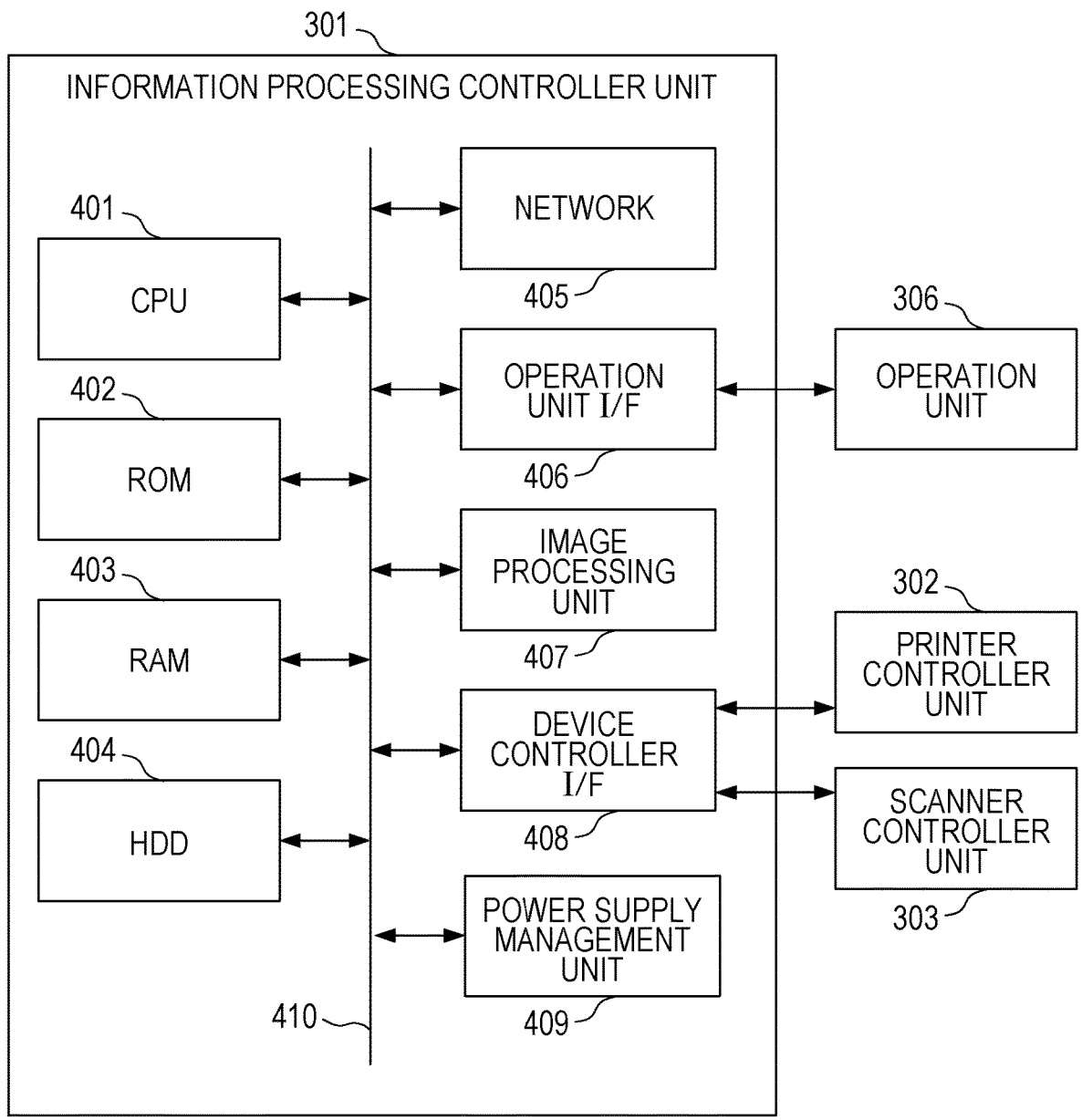
FIG. 4 is a block diagram illustrating an example of a hardware configuration of an information processing controller unit of the client machine.

FIG. 4 is a block diagram illustrating an example of a hardware configuration of the information processing controller unit 301.

As illustrated in FIG. 4, the information processing controller unit 301 includes a CPU 401. The CPU 401 is a processor that starts up an OS by a boot program saved in a ROM 402. The CPU 401 executes an application program saved in an HDD 404 on the OS to execute various kinds of processing. As a work area of the CPU 401, a RAM 403 is used. The RAM 403 is a memory, and provides the work area and an image memory area for temporarily storing image data. The HDD 404 is a storage in which the application program, image data, various setting values, and a history are saved. Note that, a configuration in which another storage device such as an SSD is included instead of or in combination with the HDD 404 may be provided.

An operation unit I/F 406, a device controller I/F 408, a network 405, an image processing unit 407, and a power supply management unit 409 are connected to the CPU 401 together with the ROM 402 and the RAM 403 via a system bus 410.

The operation unit I/F 406 is an interface with the operation unit 306 that includes a touch panel, and outputs image data, which is to be displayed on the operation unit 306, to the operation unit 306. Moreover, the operation unit I/F 406 transmits, to the CPU 401, information input by the user with use of the operation unit 306.

The scanner controller unit 303 and the printer controller unit 302 are connected to the device controller I/F 408. The device controller I/F 408 performs conversion of synchronous data and asynchronous data of image data.

The network 405 is connected to the network 100 and input/output of information with respect to each apparatus on the network 100 is performed through the network 100.

The image processing unit 407 performs processing of outputting an image to the printer 304, processing of inputting an image from the scanner 305, and processing of image rotation, image compression, resolution conversion, color space conversion, tone conversion, and the like. The power supply management unit 409 performs power supply control of entire equipment. For example, the power supply management unit 409 controls shifting to the power-saving state (in which power consumption is smaller than that in a normal energized state) that is not the normal energized state, changing from the power-saving state to the normal energized state, etc., in addition to control of on/off of power supply.

FIG. 5 is a block diagram of software, which illustrates an example of a software configuration of the client machine 120.

The software configuration illustrated in FIG. 5 is achieved when the CPU 401 executes a program stored in any one storage unit of the RAM 403, the HDD 404, and the ROM 402. In a case where the client machine 120 is an image processing apparatus such as a multifunction peripheral, software by which scanning, printing, or various functions that use a network, a memory, or the storage are achieved operates.

A user interface 501 has functions of displaying a screen, which is to be operated by the user on the operation unit 306, and notifying the software of movement of the user at a time of the operation by the user.

A plurality of functional applications 502 are provided in the equipment and a functional application 502 is provided for each of application functions of, for example, copying, printing, mail transmission, and the like. Each of the functional applications 502 causes the application function of the multifunction peripheral to operate, with an instruction of the user through the operation unit 306, data reception through the network 405, or the like as a trigger.

On reception of an instruction from the functional application 502, a job control unit 503 controls the printer controller unit 302 or the scanner controller unit 303 to execute scanning, printing, or the like.

A power supply control unit 504 controls the power supply management unit 409 in association with a state of the software in the apparatus and administers transition between the normal energized state and the power-saving state. Moreover, the power supply control unit 504 has a timer function of performing timer notification to any piece of software in the client machine 120 at a predetermined time. When a time at which the timer notification is desired to be received is previously registered in the power supply control unit 504, the software in the client machine 120 is able to perform necessary processing at the predetermined time. Note that, the power supply control unit 504 has two types of timer functions of a normal timer function capable of performing the timer notification only in a case of the normal energized state and a power-saving recovery timer function capable of performing the timer notification after shifting to the normal energized state even in a case of the power-saving state.

On reception of notification about an abnormal state that occurs mainly in the job control unit 503, the printer controller unit 302, the scanner controller unit 303, or the like, an error control unit 505 performs control to stop the entire system or to instruct a degeneracy operation.

A history/setting holding unit 506 manages nonvolatile information in the equipment. The history/setting holding unit 506 holds setting necessary for control of the multifunction peripheral or a job, and summarizes and saves an operation history of the user, an execution result of a job, occurrence of an error, or the like. The history/setting holding unit 506 holds also log information left for analyzing or debugging use when a failure of the system occurs. Note that, an entity of the nonvolatile information is held in the HDD 404.

An information processing controller state management unit 507 manages a state of each of components of the CPU 401, the RAM 403, and the like that are included in the information processing controller unit 301. Specifically, the information processing controller state management unit 507 returns a usage amount or a usage rate of the CPU 401, RAM 403, or the HDD 404 or data related to a total writing amount or the like in the HDD 404 in response to an acquisition request from another software.

An equipment usage amount management unit 508 has a function of holding information about a usage amount of the client machine 120 by the user. Specifically, the number of sheets that are discharged by the client machine 120 through a print job or the like and an amount of a material that is consumed at a time of printing are considered as the information about the usage amount. However, the information about the usage amount is not limited thereto and may include any content as long as being information necessary for grasping the usage amount of the client machine 120. In the present embodiment, the equipment usage amount management unit 508 perpetuates such contents which are transmitted from various pieces of software including the job control unit 503. By using such information, it becomes possible to perform charging in accordance with the usage amount of the client machine 120 by the user, for example.

An event collection unit 510 monitors data generated by each of the modules (501 to 508) in the equipment and has a function of normalizing the data in a form of an event and saving the resultant in a message buffer 520 for transmission to the administration server 110.

The message buffer 520 is a nonvolatile storage area that is achieved in the HDD 404, and the normalized event and the like are saved therein. In the present embodiment, as a method of normalizing an event, a JSON (JavaScript® Object Notation) format is used, but there is no limitation thereto. In addition to basic information of an event name, an occurrence time, and the like, various kinds of information are additionally added to event information, in accordance with a type of the event. The event collection unit 510 acquires such additional information from the information processing controller state management unit 507, the equipment usage amount management unit 508, or the like. A specific example of the event information will be described later.

In response to issue of an event, for example, which is detected on the basis of writing to the message buffer 520, an event transmission unit 530 reads information from the message buffer 520 and transmits the event to the administration server 110 through a network communication unit 531.

The network communication unit 531 performs communication by using the network 405.

Next, a management table of periodic collection data, which is used in the present embodiment, will be described.

The management table of the periodic collection data is exemplified in a table 1.

In the present embodiment, it is set that data, which corresponds to the management table of the periodic collection data, is held in the HDD 204, but, for example, equivalent data may be received from the administration server 110 and processing may be performed on the basis of the data.

TABLE 1

| Type of periodic collection event | Collection interval | Is periodic collection event event to be collected even in power-saving state? |
|---|---|---|
| device_charge_counts_snapshotted | 16 hours | Yes |
| info_controller_usage_snapshotted | 24 hours | No |

As in the table 1, in the management table of periodic collection data, each of contents of events to be periodically collected is associated with "collection interval" and information of "is periodic collection event event to be collected even in power-saving state?". The "collection interval" indicates a time interval at a time of performing periodic collection. The information of "is periodic collection event event to be collected even in power-saving state?" indicates information in accordance with which whether data collection is performed even in a case of the power-saving state when a time at which periodic collection is to be performed comes is designated.

FIG. 6 is a view illustrating an example of event information that is normalized and saved in the message buffer 520. Particularly, FIG. 6 illustrates an example of operation information of the client machine 120.

As described above, in the present embodiment, the event information is represented in the JSON format. The event information is configured so that a type of an event (attribute of "event_type") and a date and a time of occurrence of the event (attribute of "occur_datetime") are added and a specific content of the event that occurs (attribute of "attributes") is included as needed. Moreover, it is also possible to add additional information (attribute of "additional_info") related to the event to the event information.

The example of FIG. 6 is the event information indicating that usage amount snapshot information of the equipment that is related to charging is collected, and an attribute of "device_charge_counts_snapshotted" indicates that the event information is related to collection of the usage amount snapshot information. The number of sheets that are printed in monochrome or color (attribute of "mono_output_papers", attribute of "color_output_papers") and the total number of discharged sheets (attribute of "total_output_papers") are recorded in the event information as the additional information.

Note that, according to the management table indicated by the table 1, the data collection is performed for the data of FIG. 6 once every 16 hours. Moreover, the data of FIG. 6 corresponds to an event to be collected even in a case where the client machine 120 is in the power-saving state when the time for performing the data collection comes. In detail, the client machine 120 wakes up from the power-saving state and the data collection is performed by the client machine 120 which is in the normal energized state.

FIG. 7 is a view illustrating another example of the event information that is normalized and saved in the message buffer 520. Particularly, FIG. 7 illustrates an example of information about a use situation of a plurality of pieces of hardware which includes a processor, a memory, and a storage of the client machine 120.

The example of FIG. 7 is the event information about collection of usage amount snapshot information of the information processing controller unit 301, and an attribute of "info_controller_usage_snapshotted" indicates that the event information is related to collection of the usage amount snapshot information. In the event information, data related to a usage amount of the CPU 401, a usage amount of the RAM 403, and a usage amount of the HDD 404 (attributes of "average_usage_rate", attributes of "peek_usage_rate") are respectively recorded in an attribute of "CPU_usage", an attribute of "RAM_usage", and an attribute of "HDD_usage" as the additional information. Additionally, since the HDD 404 is consumed by access to data, so that a current lifetime (attribute of "device_life_rate") when a predicted lifetime is set as 100% is described in the attribute of "HDD_usage" as data related to the lifetime of the HDD 404. In the example of FIG. 7, the HDD 404 consumes 8% of the predicted lifetime. Note that, the data related to the lifetime of the HDD 404 which is described in the attribute of "HDD_usage" may be data related to a writing amount or the number of times of writing of the HDD 404. Moreover, in a case where the storage is not the HDD 404 but an SSD, data related to a lifetime of the storage may be data related to the number of times of rewriting of the SSD.

Note that, according to the management table indicated by the table 1, data collection is performed for the data of FIG. 7 once every 24 hours. Moreover, the data of FIG. 7 corresponds to an event that, in a case where the client machine 120 is in the power-saving state at a time when the data collection is to be performed, is not to be collected at the time.

Figure 8:
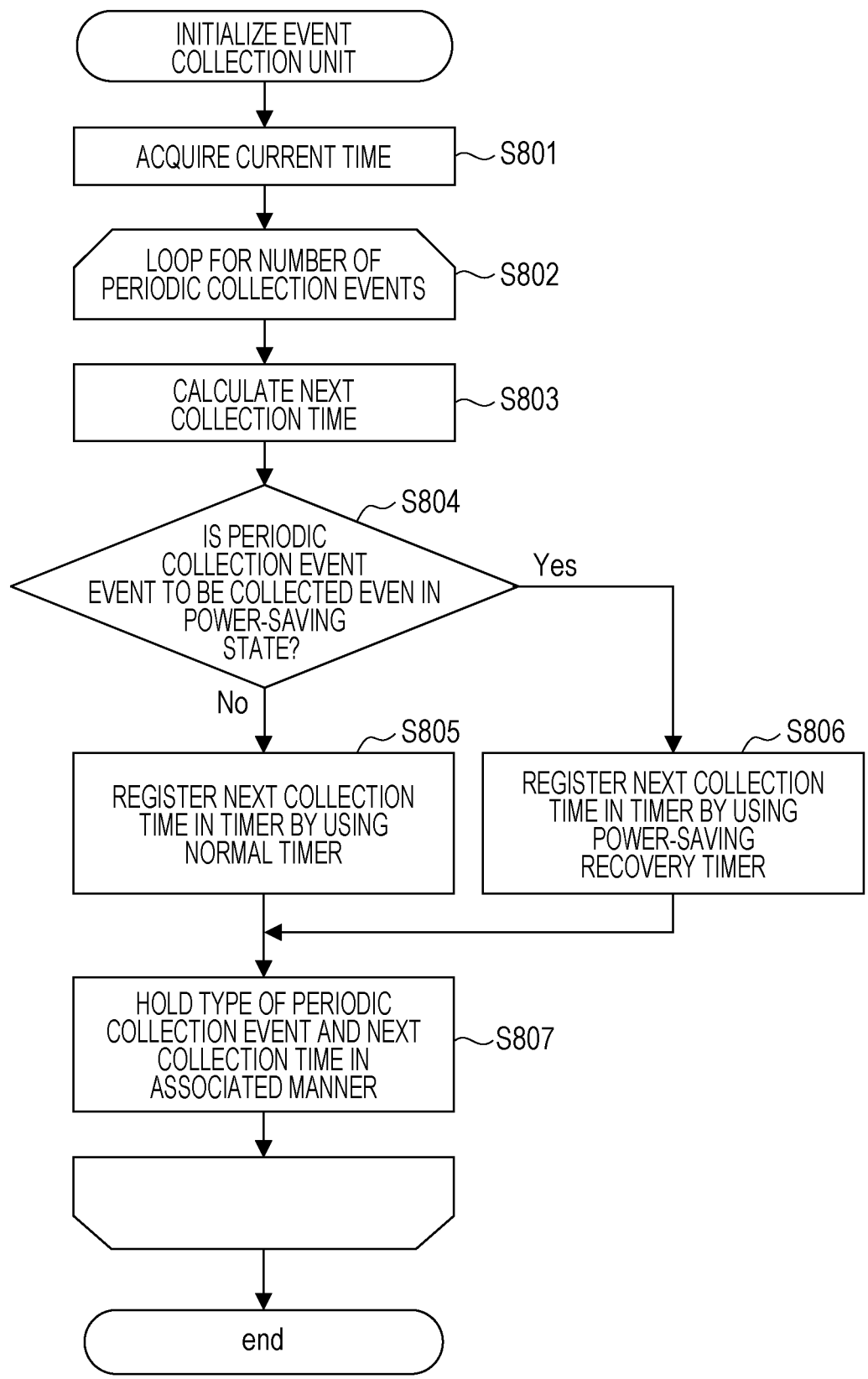
FIG. 8 is a flowchart illustrating an example of a flow of processing which is performed when the event collection unit is initialized.

FIG. 8 is a flowchart illustrating an example of a flow of processing in the present embodiment, which is performed when the event collection unit 510 is initialized. The processing corresponding to the flowchart is achieved in a case where the CPU 201 reads and executes a program, which is developed in the RAM 203, when the client machine 120 starts up.

When the processing corresponding to the flowchart starts, the event collection unit 510 acquires a current time at first (S801).

Next, the event collection unit 510 performs control to repeat subsequent processing (S803 to S807) for the number of pieces of periodic collection data to be collected (S802). Specifically, by sequentially setting each of periodic collection events described in rows of the table 1 as an event that is a target to be processed, the following processing at S803 to S807 is performed.

First, the event collection unit 510 decides a time at which the periodic collection event that is the target to be processed is collected next (S803). Specifically, the collection interval in the management table indicated by the table 1 is added to the current time acquired at S801 described above. For example, when the current time is "15:21" and the collection interval is "16 hours", the next collection time is "7:21".

Next, the event collection unit 510 determines whether or not the periodic collection event that is the target to be processed is an event to be collected even in the power-saving state (S804). Specifically, whether an item at the third column in the management table indicated by the table 1 is "Yes" or "No" is checked.

When the event collection unit 510 judges that the periodic collection event that is the target to be processed is the event to be collected even in a case where the client machine 120 is in the power-saving state (the item at the third column in the table 1 is "Yes") (in a case of Yes at S804), the processing proceeds to S806.

At S806, the event collection unit 510 registers the next collection time, which is decided at S803 described above, by using the power-saving recovery timer of the power supply control unit 504, and the processing proceeds to S807.

On the other hand, when the event collection unit 510 judges that the periodic collection event that is the target to be processed is not the event to be collected even in the case where the client machine 120 is in the power-saving state (the item at the third column in the table 1 is "No") (in a case of No at S804), the processing proceeds to S805. That is, in the case where the periodic collection event that is the target to be processed is an event that, when the client machine 120 is in the power-saving state, is not to be collected at a collection time, the procedure proceeds to S805.

At S805, the event collection unit 510 registers the next collection time, which is decided at S803 described above, by using the normal timer of the power supply control unit 504, and the procedure proceeds to S807.

After registration in the timer is performed at S805 or S806, the event collection unit 510 performs the processing at S807. At S807, the event collection unit 510 holds a type of a periodic collection event, which is a current target to be processed, and the next collection time, which is decided at S803 described above, in an area of the RAM 403 that is managed by the event collection unit 510 in an associated manner, returns the processing to S802, and shifts the target to be processed to a next periodic collection event.

As above, in the client machine 120, control is performed so that a timing when data of the periodic collection event to be collected even in the power-saving state is transmitted is managed by the power-saving recovery timer. Moreover, control is performed so that a timing when data of the periodic collection event not to be collected in the power-saving state is transmitted is managed by the normal timer. Accordingly, a timing at which data is collected in the client machine 120 and transmitted to the administration server 110 that is an external system is able to be appropriately managed for each of the periodic collection events.

Figure 9A:
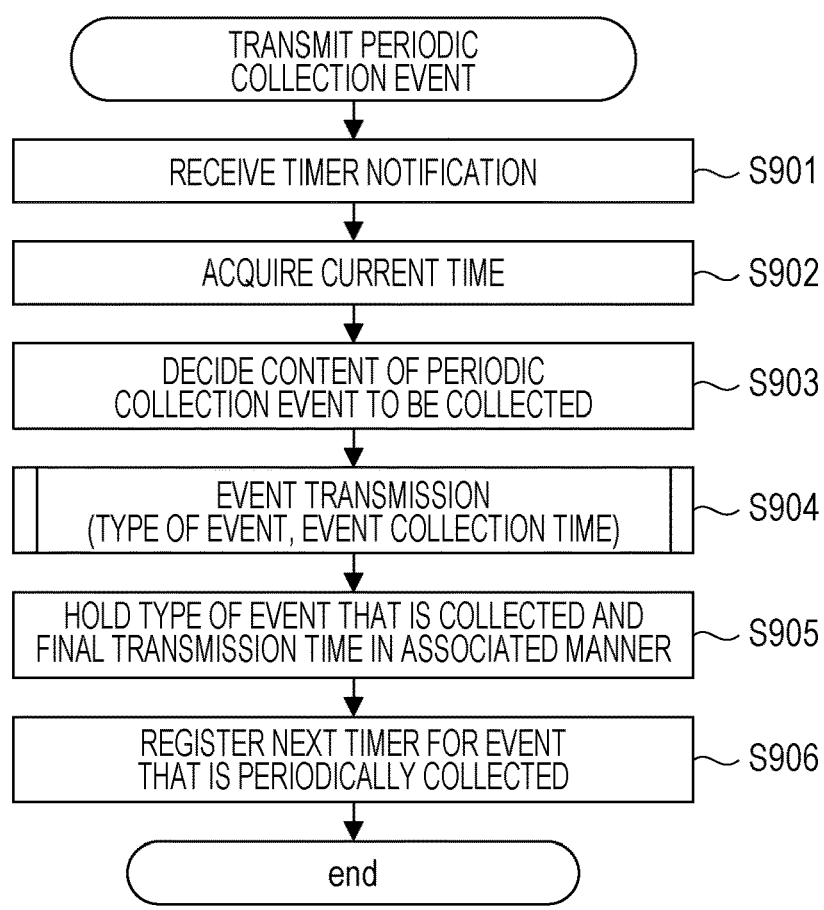
FIGS. 9A and 9B are flowcharts each illustrating an example of a flow of processing which is performed when a periodic collection event is collected.
Figure 9B:
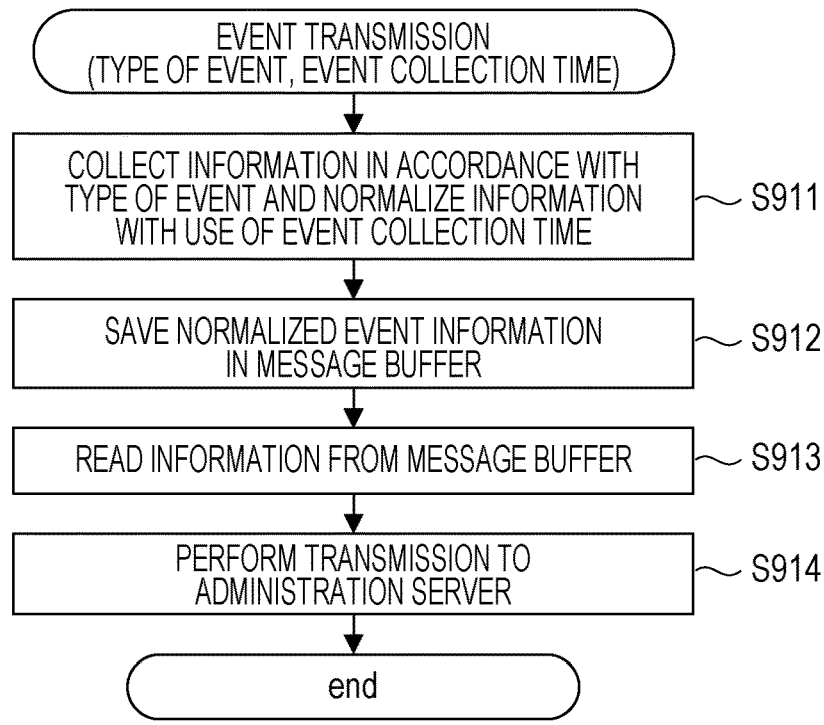

FIGS. 9A and 9B are flowcharts each illustrate an example of a flow of processing in the present embodiment, which is performed when the periodic collection event is collected. The processing corresponding to the flowcharts is achieved when the CPU 201 reads and executes a program, which is developed in the RAM 203, when the client machine 120 starts up.

First, description will be given for the flowchart of FIG. 9A.

At first, when the event collection unit 510 receives, from the power supply control unit 504, notification that the timer in which registration has been performed in advance works (a date and a time that are registered in the timer in advance comes) (S901), the procedure proceeds to S902. Note that, the timer corresponds to the timer in which registration is performed by the event collection unit 510 at S805 or S806 in the flowchart of FIG. 8.

At S902, the event collection unit 510 acquires a current time at first. Furthermore, at S903, the event collection unit 510 decides a content of the periodic collection event to be collected, on the basis of the current time acquired at S902 described above. Specifically, the event collection unit 510 compares the next collection time and the type of the periodic collection event that are held in advance in the area of the RAM 403, which is managed by the event collection unit 510, at S807 of FIG. 8 to the current time acquired at S902 described above, and decides which periodic collection event described in the table 1 is to be collected.

Next, the event collection unit 510 performs a series of processing of event transmission on the basis of the type of the periodic collection event that is decided at S903 described above and the current time (S904). Detailed description of processing at S904 will be given later with reference to FIG. 9B.

When the processing at S904 described above is completed, the event collection unit 510 holds the type of the event that is collected and a transmission completion time (final transmission time of the periodic collection event that is the target to be processed) in an associated manner in a predetermined area of the RAM 403 (S905).

Finally, the event collection unit 510 registers a next collection time and an appropriate timer for next acquisition of the event that is transmitted at S904 described above (S906). Since the processing is similar to the processing at S803 to S807 of FIG. 8, redundant description thereof will be omitted.

Next, detailed description of the processing at S904 of FIG. 9A will be given with reference to FIG. 9B. In accordance with the content of the event that is received, the event collection unit 510 collects, from each module of the equipment, information which is previously associated with the content of the event that is received (S911). For example, in a case of the event of the usage amount snapshot information of the equipment that is related to charging and illustrated in FIG. 6, the event collection unit 510 collects the number of various types of discharged sheets from the equipment usage amount management unit 508. Moreover, for example, in a case of the usage amount snapshot information of the information processing controller, which is illustrated in FIG. 7, the event collection unit 510 collects information of, for example, usage rates of the CPU 401, the RAM 403, and the HDD 404 from the information processing controller state management unit 507. In addition thereto, the event collection unit 510 normalizes the information into a general-purpose format like the aforementioned JSON with use of given time information.

After that, the event collection unit 510 saves the normalized event information in the message buffer 520 (S912). At this time point, a content to be transmitted to the administration server 110 is fixed.

The event transmission unit 530 that asynchronously detects writing at S912 described above reads the event information from the message buffer 520 (S913) and performs a transmission operation to the administration server 110 (S914). Here, the transmission operation that includes an authentication operation to the administration server 110, retry processing when a communication error occurs, and the like is performed up to transmission completion. The administration server 110 to which the event information is transmitted saves the received event information in the storage.

As above, various events that occur in the client machine 120 are transmitted to the administration server 110 and collected at an appropriate timing.

Figure 10:
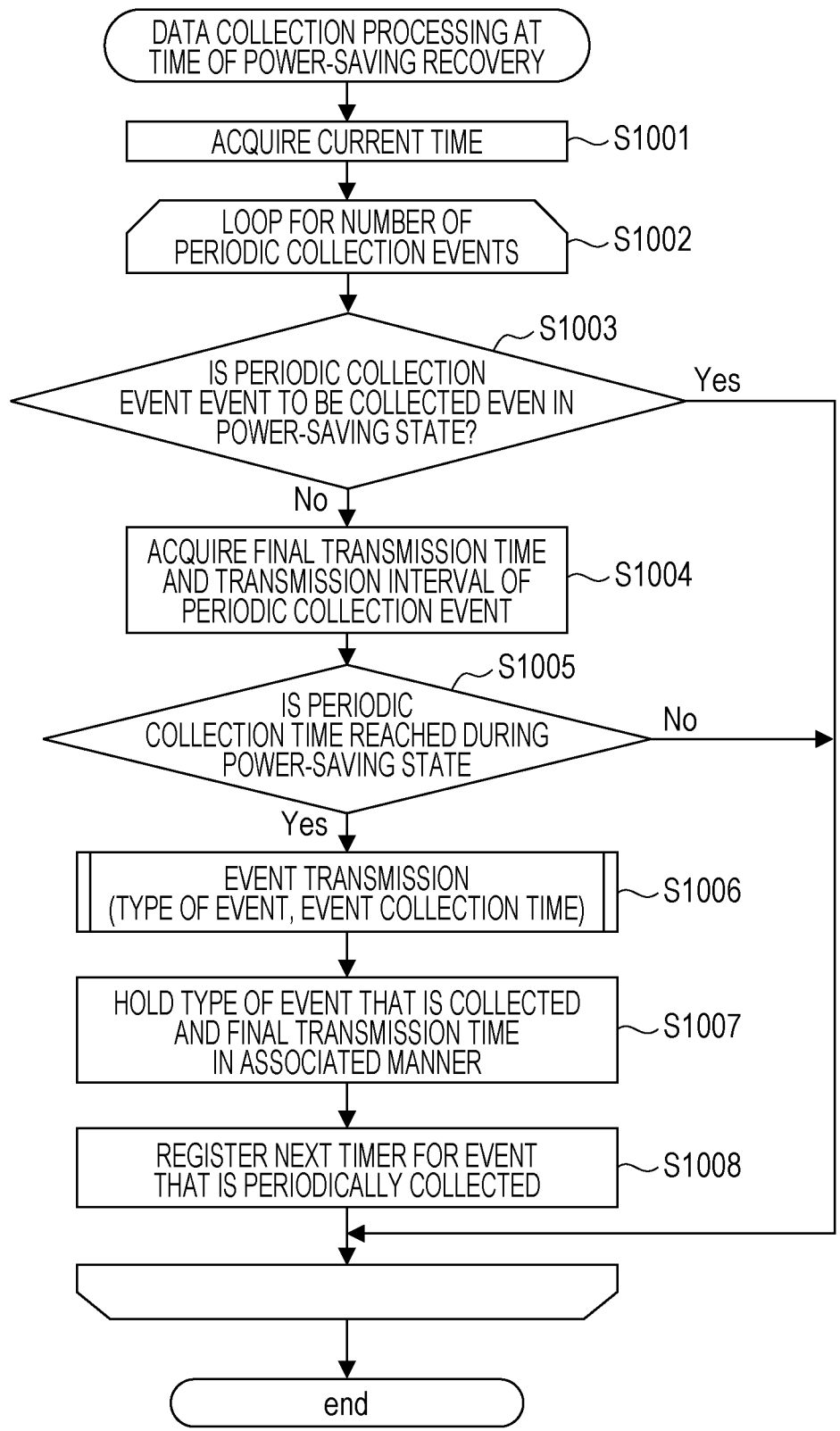
FIG. 10 is a flowchart illustrating an example of processing in a first embodiment, which is performed by the event collection unit in response to recovery of the client machine from a power-saving state.

FIG. 10 is a flowchart illustrating an example of processing in the first embodiment, which is performed by the event collection unit 510 in response to recovery of the client machine 120 from the power-saving state. The processing corresponding to the flowchart is achieved when the CPU 201 reads and executes a program developed in the RAM 203.

First, the event collection unit 510 acquires a current time (S1001).

Next, the event collection unit 510 performs control to repeat subsequent processing (S1003 to S1008) for the number of pieces of periodic collection data to be collected (S1002). Specifically, by sequentially setting each of periodic collection events described in the table 1 as an event that is a target to be processed, the following processing at S1003 to S1008 is performed.

First, the event collection unit 510 determines whether or not the periodic collection event that is the target to be processed is an event to be collected even in the power-saving state (S1003). Specifically, whether an item at the third column in the management table indicated by the table 1 is "Yes" or "No" is checked.

When judging that the periodic collection event that is the target to be processed is the event to be collected even in the case where the client machine 120 is in the power-saving state (the item at the third column in the table 1 is "Yes") (in a case of Yes at S1003), the event collection unit 510 returns the processing to S1002 and performs control to shift the target to be processed to a next periodic collection event.

On the other hand, when the event collection unit 510 judges that the periodic collection event that is the target to be processed is not the event to be collected even in the case where the client machine 120 is in the power-saving state (the item at the third column in the table 1 is "No") (in a case of No at S1003), the processing proceeds to S1004. That is, in a case where the periodic collection event that is the target to be processed is the event that, when the client machine 120 is in the power-saving state, is not to be collected at a collection time, the procedure proceeds to S1004.

At S1004, the event collection unit 510 acquires the final transmission time of the periodic collection event that is the target to be processed, which is held at S905 of FIG. 9A, and a transmission interval.

After that, the event collection unit 510 judges whether or not a time obtained by adding the final transmission time and the transmission interval which are acquired at S1004 described above, that is, a next periodic collection time exceeds the current time which is acquired at S1001 described above (S1005).

Then, when judging that the next periodic collection time does not exceed the current time (in a case of No at S1005), the event collection unit 510 returns the processing to S1002 and shifts the target to be processed to a next periodic collection event.

On the other hand, when judging that the next periodic collection time has already exceeded the current time (in a case of Yes at S1005), the event collection unit 510 advances the processing to S1006.

At S1006, the event collection unit 510 performs processing of event transmission similarly to S904 of FIG. 9A (that is, FIG. 9B).

Furthermore, the event collection unit 510 updates the final transmission time (S1007).

Moreover, the event collection unit 510 registers the timer for next periodic collection (S1008), returns the processing to S1002, and shifts the target to be processed to a next periodic collection event. Note that, at S1008 described above, the normal timer of the power supply control unit 504 is used.

As above, the client machine 120 has a configuration in which, in accordance with a type of an event that is to be transmitted to the administration server 110, the event is not transmitted in the case where the client machine 120 is in the power-saving state, and the event is transmitted in the case where the client machine 120 is not in the power-saving state. Accordingly, in an image processing apparatus, such as the client machine 120, which transmits various events to an external system such as the administration server 110, it is possible to suppress an increase in power consumption or prevent information with low effectiveness from being transmitted. Accordingly, for an event log that is periodically acquired, it is possible to perform appropriate data collection in accordance with characteristics of the event log.

Thus, for information about data related to charging or the like, it is possible to perform data collection after recovery from the power-saving state, and, for data that is desired to be acquired while the equipment operates, it is possible to perform, without recovering from the power-saving state, data collection at a different timing, such as a time of recovery from the power-saving state. Accordingly, there is an advantage that it is possible to improve power-saving performance of equipment and suppress transmission of data with low effectiveness to an administration server.

Second Embodiment

In the first embodiment, the configuration in which whether to perform data collection by recovering from the power-saving state is able to be switched in accordance with a type of a periodic collection event to be collected has been described. Additionally, description that, for a periodic collection event that does not cause recovery from the power-saving state, data collection is performed, for example, at a time of recovery from the power-saving state and accordingly there is the advantage that it is possible to improve power-saving performance of the equipment and suppress transmission of data with low effectiveness to the administration server is given. In the first embodiment, it is described that, for important information such as data related to charging, data collection is performed by recovering from the power-saving state. Even in this situation, since the recovery from the power-saving state is performed, periodic event collection processing illustrated in FIG. 10 is performed. However, in this situation, since any operation instruction such as a print instruction is not received from a user for operating, effectiveness of collecting an operation situation of the equipment at this time point may be considered to be low. An embodiment for coping with such a case will be described below.

Hereinafter, processing at a time of recovery from the power-saving state in a second embodiment will be described with reference to FIG. 11.

Figure 11:
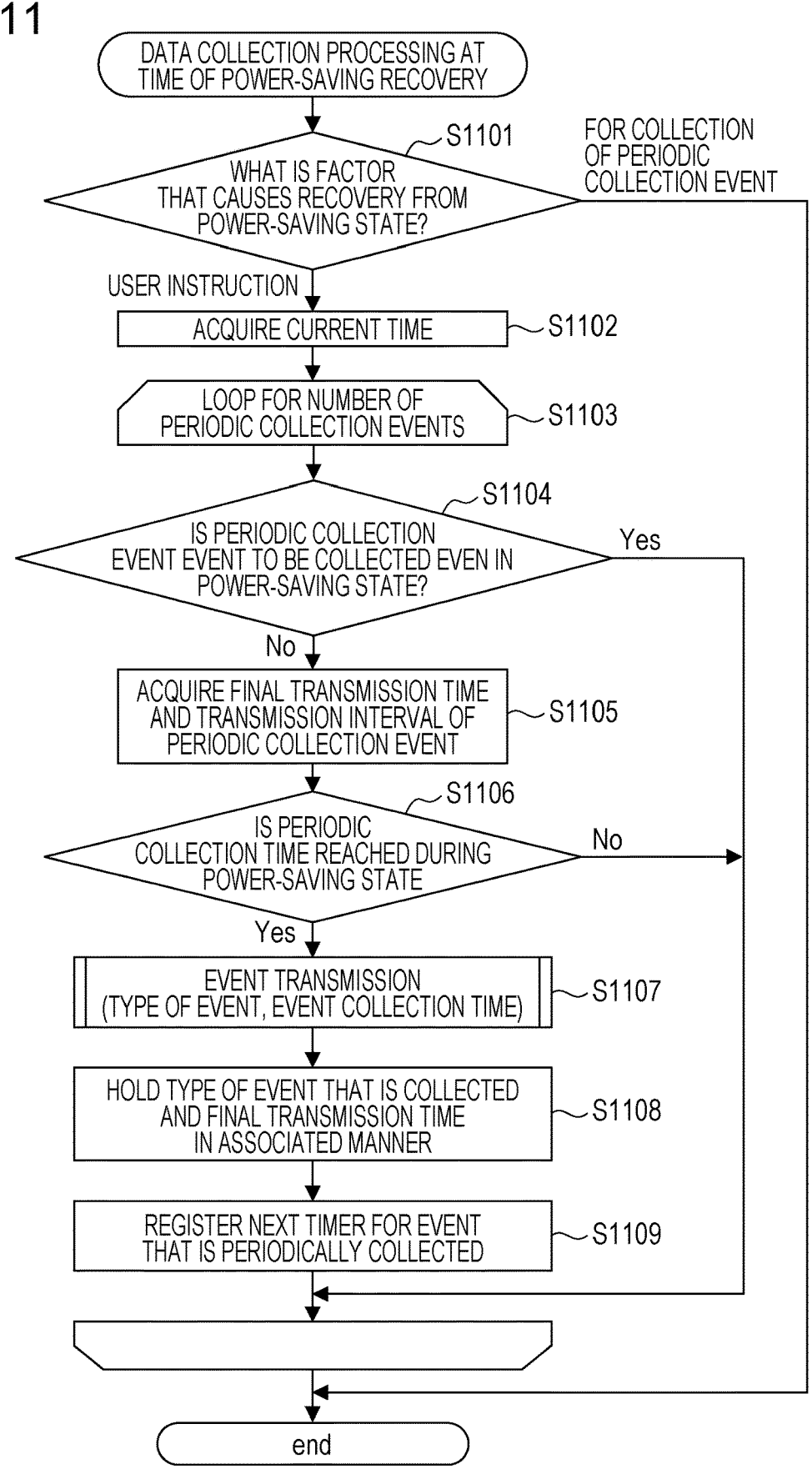
FIG. 11 is a flowchart illustrating an example of processing in a second embodiment, which is performed by an event collection unit in response to recovery of a client machine from a power-saving state.

FIG. 11 is a flowchart illustrating an example of processing in the second embodiment, which is performed by the event collection unit 510 in response to recovery of the client machine 120 from the power-saving state. The processing corresponding to the flowchart is achieved when the CPU 201 reads and executes a program developed in the RAM 203.

Note that, FIG. 11 corresponds to FIG. 10 in the first embodiment.

First, when detecting the recovery from the power-saving state, the event collection unit 510 checks what factor causes the recovery from the power-saving state (S1101). Specifically, the event collection unit 510 inquires, of the power supply control unit 504, the factor of the recovery from the power-saving state.

Then, in a case of judging that the recovery from the power-saving state is performed on the basis of any instruction, such as a print instruction, from the user (user instruction) (in a case of a "user instruction" at S1101), the event collection unit 510 performs processing at S1102 to S1109. Note that, the processing at S1102 to S1109 is similar to the processing at S1001 to S1008 of FIG. 10, and collection of the periodic collection event to be collected during the power-saving state is performed as needed.

On the other hand, in a case of judging that the recovery from the power-saving state is performed for collection of the periodic collection event (in a case of "for collection of periodic collection event" at S1101), the event collection unit 510 ends the processing of the flowchart.

As above, a configuration is provided so that an operation situation of equipment is not collected in a case where, at the time of the recovery from the power-saving state, it is determined that a situation in which data collection is not effective is provided as in the case where recovery from the power-saving state is performed for collection of the periodic collection event. Accordingly, it is possible to suppress transmission of data with low effectiveness to the administration server 110.

Third Embodiment

In the first embodiment and the second embodiment described above, it is indicated that, for the periodic collection event, such as the usage amount snapshot information of the information processing controller unit 301, which does not cause the recovery from the power-saving state, whether or not to perform data collection at a timing of the recovery from the power-saving state is determined and data collection is accordingly able to be appropriately performed.

Now, there is a case where data with a different level of importance is mixed in a single event such as the usage amount snapshot information of the information processing controller unit 301. In such a case, considered is a case where changing, depending on a collection timing, a content of data to be collected is effective. In the present embodiment, processing in such a case will be described.

As the aforementioned usage amount snapshot information of the information processing controller unit 301, data transmission of which does not make much sense when the transmission is performed in a state that is not a state where the apparatus ordinarily operates, for example, immediately after the recovery from the power-saving state may be included in data to be periodically transmitted.

For example, in a case of the usage amount snapshot information of the information processing controller unit 301, a CPU usage rate and a memory usage amount are much affected by a state of the equipment. Additionally, at the time of the power-saving recovery, various kinds of special processing that are not performed in a normal state are performed. Thus, it is considered that transmission of data of the CPU usage rate and the memory usage amount to the administration server 110 immediately after the power-saving recovery does not make much sense. On the other hand, the storage is a nonvolatile device and is not much affected even by processing of the power-saving recovery. Thus, it is considered that transmission of a storage usage amount to the administration server 110 at the time of the power-saving recovery has a certain meaning.

Then, for example, in a case where a timing when usage amount snapshot information of the information processing controller is periodically collected comes in the normal energized state, data related to the CPU usage rate, the memory usage amount, and the storage usage amount is transmitted. On the other hand, it is configured so that, in a case where the timing when the usage amount snapshot information of the information processing controller is periodically collected comes in the power-saving state, at the time of the recovery from the power-saving state thereafter, only information about the storage usage amount is transmitted. Hereinafter, detailed description will be given.

FIG. 12 is a view illustrating an example of event information to be collected (to be collected at S1006 of FIG. 10 or S1107 of FIG. 11) at the time of the recovery from the power-saving state in a third embodiment.

The event information is event information about collection of the usage amount snapshot information of the information processing controller unit 301 similarly to FIG. 7, and an attribute of "info_controller_usage_snapshotted" indicates that the event information is related to collection of the usage amount snapshot information. Note that, the following point is different from that of FIG. 7.

In the example of the event illustrated in FIG. 7, the data related to the usage amounts of the CPU 401, the RAM 403, and the HDD 404 is included, but only the usage amount of the HDD 404 (attribute of "HDD_usage") is described here as the additional information. Furthermore, as the information of the usage amount of the HDD 404, only information about the lifetime of the HDD 404 (attribute of "device_life_rate") is described.

This is because the information about the lifetime of the HDD 404 is important information for using the equipment. For example, in a case where the attribute of "device_life_rate" is "100", it is indicated that the lifetime of the HDD 404 has reached the end of a predicted lifetime which is assumed at a time of manufacturing the HDD 404. Thus, there is a possibility that, when continuing to be used without being replaced, the HDD 404 becomes unusable because of expiration of the lifetime. Moreover, the lifetime of the HDD 404 is generally set to be several years in many cases, so that it is assumed that effectiveness of the data is not changed even in a case where an acquisition timing changes by about several hours to several days. Thus, there is no problem even when a periodic collection event of the information about the lifetime of the HDD 404 is set as the periodic collection event that does not causes the recovery from the power-saving state. However, since the information about the lifetime of the HDD 404 is important information, transmission thereof is performed at the time of the recovery from the power-saving state.

In the present embodiment, for example, in the case where the timing when the usage amount snapshot information of the information processing controller is periodically collected comes in the normal energized state, the data related to the usage amounts of the CPU 401, the RAM 403, and the HDD 404 is collected and transmitted as the additional information as illustrated in FIG. 7. On the other hand, in the case where the timing when the usage amount snapshot information of the information processing controller is periodically collected comes in the power-saving state, at the time of the recovery from the power-saving state thereafter, only the information (attribute of "device_life_rate") about the lifetime of the HDD 404, which is the information of the usage amount of the HDD 404, is collected and transmitted as the additional information as illustrated in FIG. 12.

Note that, in the event information illustrated in FIG. 12, in order to allow determination that only partial information is acquired at the time of the recovery from the power-saving state, information (attribute of "snapshotted_on_wake_up") indicating that the information is acquired at the time of the recovery from the power-saving state is added. With such a configuration, also in the administration server 110, by checking only presence or absence of the attribute of "snapshotted_on_wake_up", it is possible to easily check what content of information is included.

As above, according to the present embodiment, by appropriately changing a content of data to be transmitted in accordance with a collection timing, it is possible to suppress transmission of data with low effectiveness to the administration server 110.

As above, each of the embodiments has a configuration in which, in accordance with a type of an event to be transmitted to an external system (administration server 110), transmission of the event is restricted in a case where an image processing apparatus (client machine 120) is in a power-saving state, and the transmission of the event is performed in a case where the image processing apparatus is not in the power-saving state. With the configuration, in the image processing apparatus that transmits various events to the external system, it is possible to collect and transmit appropriate data in accordance with characteristics of an event log that is periodically collected and transmitted, and it is possible to suppress an increase in power consumption and suppress transmission of information with low effectiveness.

Accordingly, it is possible to appropriately transmit data, which is collected in the apparatus, to the external system in accordance with characteristics of the data while suppressing an increase in power consumption, thus making it possible to appropriately perform various maintenance operations, improvement, and other processing. Thus, it becomes possible to appropriately manage the image processing apparatus.

Note that, the configurations of the various pieces of data and the content thereof, which are described above, are not limited thereto, and needless to say, a configuration is provided with various configurations and contents in accordance with a use or a purpose.

As above, though certain embodiments have been described, the present disclosure may be embodied as a mode of, for example, a system, an apparatus, a method, a program, a storage medium, or the like. Specifically, the present disclosure may be applied to a system constituted by a plurality of pieces of equipment, or, may be applied to an apparatus constituted by one piece of equipment.

Moreover, all configurations achieved by combining the aforementioned embodiments are also included in the scope of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-054262 filed Mar. 22, 2019, which is hereby incorporated by reference herein in its entirety.

What is claimed is:

1. An image processing apparatus comprising:
   a storage;
   a transmitter;
   at least one memory storing instructions; and
   at least one processor that executes the instructions to cause the image processing apparatus to:
   manage a timing when data that is collected in the image processing apparatus is to be transmitted to an external system;
   transmit first data that is collected as operation information of the image processing apparatus and second data that is collected as a use situation of a plurality of pieces of hardware in the image processing apparatus to the external system through the transmitter in a case where a state of the image processing apparatus is not a power-saving state at the timing that is managed; and
   restrict transmission of the second data through the transmitter and transmit the first data to the external system through the transmitter in a case where the state of the image processing apparatus is the power-saving state at the timing that is managed.

2. The image processing apparatus according to claim 1, wherein execution of the instructions further causes the image processing apparatus to:
   perform registration processing by using, among a first timer by which notification based on time measurement is able to be performed even in the power-saving state and a second timer by which the notification is not performed in the power-saving state, the first timer, in a case where the first data is set as a target to be transmitted to the external system; and
   wherein, in the case where the state of the image processing apparatus is the power-saving state at the timing that is managed, the image processing apparatus is recovered from the power-saving state in response to the notification from the first timer, so that the first data is transmitted to the external system through the transmitter at the timing that is managed.

3. The image processing apparatus according to claim 1, wherein execution of the instructions further causes the image processing apparatus to:
   transmit at least partial data of the second data to the external system through the transmitter at a time when the image processing apparatus is recovered from the power-saving state, in a case where a transmission timing of the second data is passed during the power-saving state.

4. The image processing apparatus according to claim 3, wherein at least the partial data of the second data is data related to a lifetime of the storage.

5. The image processing apparatus according to claim 4, wherein the data related to the lifetime of the storage is a writing amount of the storage or the number of times of writing.

6. The image processing apparatus according to claim 3, wherein in a case where a factor that causes the image processing apparatus to be recovered from the power-saving state is a transmission timing of the first data,
   the transmission of the second data through the transmitter is restricted.

7. A method for an image processing apparatus having a storage and a transmitter, the method comprising:
   managing a timing when data that is collected in the image processing apparatus is to be transmitted to an external system;
   transmitting first data that is collected as operation information of the image processing apparatus and second data that is collected as a use situation of a plurality of pieces of hardware in the image processing apparatus to the external system through the transmitter in a case where a state of the image processing apparatus is not a power-saving state at the timing that is managed; and
   restricting transmission of the second data through the transmitter and transmitting the first data to the external system through the transmitter in a case where the state of the image processing apparatus is the power-saving state at the timing that is managed.

8. A non-transitory computer-readable storage medium having computer executable instructions stored thereon, wherein execution of the instructions by a computer causes an image processing apparatus incorporating the computer and having a storage and a transmitter to:
   manage a timing when data that is collected in the image processing apparatus is to be transmitted to an external system;

transmit first data that is collected as operation information of the image processing apparatus and second data that is collected as a use situation of a plurality of pieces of hardware in the image processing apparatus to the external system through the transmitter in a case where a state of the image processing apparatus is not a power-saving state at the timing that is managed; and restrict transmission of the second data through the transmitter and transmit the first data to the external system through the transmitter in a case where the state of the image processing apparatus is the power-saving state at the timing that is managed.

\* \* \* \* \*